United States Patent
Mayer et al.

(10) Patent No.: US 6,249,830 B1
(45) Date of Patent: Jun. 19, 2001

(54) METHOD AND APPARATUS FOR DISTRIBUTING INTERRUPTS IN A SCALABLE SYMMETRIC MULTIPROCESSOR SYSTEM WITHOUT CHANGING THE BUS WIDTH OR BUS PROTOCOL

(75) Inventors: Dale J. Mayer, Houston; Sompong Paul Olarig; William F. Whiteman, both of Cypress; David F. Heinrich, Tomball, all of TX (US)

(73) Assignee: Compaq Computer Corp., Houston, TX (US)

( * ) Notice: Subject to any disclaimer, the term of this patent is extended or adjusted under 35 U.S.C. 154(b) by 0 days.

(21) Appl. No.: 09/532,109

(22) Filed: Mar. 21, 2000

Related U.S. Application Data (63) Continuation of application No. 09/243,235, filed on Feb. 2, 1999, now Pat. No. 6,041,377, which is a continuation of application No. 08/699,912, filed on Aug. 20, 1996, now abandoned.

(51) Int. Cl.⁷ .................................................. G06F 13/00
(52) U.S. Cl. ................................. 710/113; 710/260
(58) Field of Search ............................ 710/113, 9, 260

(56) References Cited

U.S. PATENT DOCUMENTS

| | | | |
|---|---|---|---|
| 5,125,093 | 6/1992 | McFarland | 395/725 |
| 5,283,904 * | 2/1994 | Carson et al. | 710/266 |
| 5,379,434 | 1/1995 | DiBrino | 395/725 |
| 5,410,710 | 4/1995 | Sarangdhar et al. | 395/725 |
| 5,434,997 | 7/1995 | Landry et al. | 395/575 |
| 5,437,042 | 7/1995 | Culley et al. | 395/800 |
| 5,446,910 | 8/1995 | Kennedy et al. | 395/800 |
| 5,481,725 | 1/1996 | Jayakumar et al. | 395/725 |
| 5,530,891 | 6/1996 | Gephardt | 395/800 |
| 5,555,430 | 9/1996 | Gephardt et al. | 395/800 |
| 5,564,060 | 10/1996 | Mahalingaiah et al. | 395/871 |
| 5,568,649 | 10/1996 | MacDonald et al. | 395/868 |
| 5,613,126 | 3/1997 | Schmidt | 395/733 |
| 6,041,377 * | 3/2000 | Mayer et al. | 710/113 |

FOREIGN PATENT DOCUMENTS

| | | | |
|---|---|---|---|
| 0 602 858 A1 | 6/1994 | (EP) | 13/26 |
| 0 685 798 A2 | 12/1995 | (EP) | 13/26 |

OTHER PUBLICATIONS

Hewlett Packard; "White Paper on Multiprocessing"; Jun. 1995; pp. 1–11.

Intel; "Pentium Processor Integrated APIC"; pp. 19–4 through 19–40; Apr. 1994.

Advanced Micro Devices and Cyrix Corporation; AMD web site; "The Open Programmable Interrupt controller (PIC) Register Interface Specification Revision 1.2"; Oct. 1995; pp. 1–24.

(List continued on next page.)

Primary Examiner—David A. Wiley
(74) Attorney, Agent, or Firm—Fletcher, Yoder & Van Someren (57) ABSTRACT

A method for supporting multiple distributed interrupt controllers, designated as bus agents, in a symmetric multiprocessing system, which method includes the steps of assigning a unique identification number to each bus agent, receiving bus requests from the bus agents over four data lines in groups of four, and granting bus ownership to a selected one of the requesting bus agents. Similarly, a computer system that supports multiple distributed interrupt controllers, designated as bus agents, in a symmetric multiprocessing system, which computer system includes structure for assigning a unique identification number to each bus agent, four data lines for receiving bus requests from the bus agents in groups of four, and structure for granting bus ownership to a selected one of the requesting bus agents.

12 Claims, 9 Drawing Sheets

OTHER PUBLICATIONS

Cyrix Technical Brief; "OpenPIC™ Architecture"; pp. 1–2.

AMD News Release; "Advanced Micro Devices and Cyrix Jointly Develop OpenPIC™ Technology Standard"; Jun. 4, 1996; pp. 1–2.

Russo, A.P.: "The Alphaserver 2100 I/O Subsystem", Digital Technical Journal, vol. 6, No. 3, Jan. 1, 1994, pp. 20–28, XP000575573, p. 25, Right–Hand Column, Line 5–P. 26, Left–Hand Column, Line 46.

* cited by examiner

METHOD AND APPARATUS FOR DISTRIBUTING INTERRUPTS IN A SCALABLE SYMMETRIC MULTIPROCESSOR SYSTEM WITHOUT CHANGING THE BUS WIDTH OR BUS PROTOCOL

This application is a continuation of Ser. No. 09/243,235 filed on Feb. 2, 1999, now U.S. Pat. No. 6,041,377 which is a continuation of Ser. No. 08/699,912 filed on Aug. 20, 1996, now abandoned.

CROSS REFERENCE TO RELATED APPLICATION

This application hereby incorporates by reference the following co-assigned U.S. patent application, entitled "METHOD AND APPARATUS FOR DISTRIBUTING INTERRUPTS IN A SYMMETRIC MULTIPROCESSOR SYSTEM", concurrently filed herewith.

BACKGROUND OF THE INVENTION

1. Technical Field of the Invention

The present invention relates to computer systems and, in particular, to a method and apparatus for distributing interrupts in a scalable symmetric multiprocessor system.

2. Description of Related Art

The emergence of symmetric multiprocessing ("SMP") systems in today's high-end personal computer ("PC") and server markets has generated a need for new design approaches that achieve optimal performance within this expanded system structure. Some of the most significant challenges of multiprocessor system development include the design of a multiprocessor-capable bus ("MP bus") and the channeling and processing of interrupts through an SMP-aware interrupt controller. As is well understood in the art, the MP bus services multiple processing units, providing access to the main memory and other components of the system.

Conventionally, a multiprocessing system is a computer system that has more than one processor, and that is typically designed for high-end workstations or file server usage. Such a system may include a high-performance bus, huge quantities of error-correcting memory, redundant array of inexpensive disk ("RAID") drive systems, advanced system architectures that reduce bottlenecks, and redundant features such as multiple power supplies.

In the most general sense, multiprocessing is defined as the use of multiple processors to perform computing tasks. The term could apply to a set of networked computers in different locations, or to a single system containing several processors. As is well-known, however, the term is most often used to describe an architecture where two or more linked processors are contained in a single enclosure. Further, multiprocessing does not occur just because multiple processors are present. For example, having a stack of PCS in a rack is not multiprocessing. Similarly, a server with one or more "standby" processors is not multiprocessing, either. The term "multiprocessing", therefore, applies only when two or more processors are working in a cooperative fashion on a task or set of tasks.

There are many variations on the basic theme of multiprocessing. In general, the differences are related to how independently the various processors operate and how the workload among these processors is distributed. In loosely-coupled multiprocessing, the processors perform related tasks, but, they do so as if they were standalone processors. Each processor may have its own memory and may even have its own mass storage. Further, each processor typically runs its own copy of an operating system, and communicates with the other processor or processors through a message-passing scheme, much like devices communicating over a local-area network. Loosely-coupled multiprocessing has been widely used in mainframes and minicomputers, but the software to do it is very closely tied to the hardware design. For this reason, it has not gained the support of software vendors, and is not widely used in PC servers.

In tightly-coupled multiprocessing, by contrast, the operations of the processors are more closely integrated. They typically share memory, and may even have a shared cache. The processors may not be identical to each other, and may or may not perform similar tasks. However, they typically share other system resources such as mass storage and input/output ("I/O"). Moreover, instead of a separate copy of the operating system for each processor, they typically run a single copy, with the operating system handling the coordination of tasks between the processors. The sharing of system resources makes tightly-coupled multiprocessing less expensive, and it is the dominant multiprocessor architecture in network servers.

Hardware architectures for tightly-coupled multiprocessing systems can be further divided into two broad categories. In symmetrical multiprocessor systems, system resources such as memory and disk input/output are shared by all the microprocessors in the system. The workload is distributed evenly to available processors so that one does not sit idle while another is loaded with a specific task. The performance of SMP systems increases, at least theoretically, for all tasks as more processor units are added. This highly sought-after design goal is called scalability.

In asymmetrical multiprocessor systems, tasks and system resources are managed by different processor units. For example, one processor unit may handle I/O and another may handle network operating system ("NOS") tasks. It can be readily seen that asymmetrical multiprocessor systems do not balance workloads. Thus, it is quite conceivable that a processor unit handling one task can be overworked while another unit sits idle.

It can further be noted that within the category of SMP systems are two subcategories, based on the way cache memory is implemented. The lower-performance subcategory includes "shared-cache" multiprocessing, and the higher-performance subcategory encompasses what is known as "dedicated-cache" multiprocessing. In dedicated-cache multiprocessing, every processor has, in addition to its "level 1" on-chip memory, a dedicated "level 2" off-chip memory cache (one per processor). These caches accelerate the processor-memory interaction in an MP environment. On the other hand, in shared-cache multiprocessing, the processors share a single "level 2" cache. Typically, shared-cache architecture offers less scalability than dedicated-cache architecture.

As briefly mentioned above, one of the most significant design challenges, in either broad category of multiprocessing, is the routing and processing of interrupts. Conventionally, an interrupt controller is responsible for delivering interrupts from interrupt sources to interrupt destinations in an MP system. An interrupt may be generalized as an event that indicates that a certain condition exists somewhere in the system that requires the attention of at least one processor. The action taken by a processor in response to an interrupt is commonly referred to as "servicing" or "handling" the interrupt.

In an SMP system, each interrupt has an identity that distinguishes it from the others. This identity is commonly referred to as the "vector" of the interrupt. The vector allows the servicing processor or processors to find the appropriate handler for the interrupt. When a processor accepts an interrupt, it uses the vector to locate the entry point of the handler in its interrupt table. In addition, each interrupt may have an interrupt priority that determines the timeliness with which the interrupt should be serviced relative to the other pending activities or tasks of the servicing processor.

There are, in general, two interrupt distribution modes available for an interrupt controller for delivering interrupts to their appropriate destinations in an MP system. In the directed delivery mode ("static" delivery), the interrupt is unconditionally delivered to a specific processor that matches the destination information supplied with the interrupt. Under the distributed delivery mode ("dynamic" delivery), interrupt events from a particular source will be distributed among a group of processors specified by the destination field value.

From the foregoing, it should be appreciated that balancing the interrupt loading among various processors in a scalable MP system is a very desirable goal. However, as is well understood in the art, it is a hard goal to accomplish from the system designer's perspective. Architecturally, two types of solutions exist for delivering interrupts to their destinations in an SMP environment. In one solution, for example, a centralized interrupt controller is disposed between a host bus and system bus such as the Peripheral Component Interconnect ("PCI") bus, for receiving interrupts from their sources and routing them to their destinations in either directed or distributed mode. Further, in this type of solution, a counter of certain bit-length is typically provided with each processing unit therein. The counter size is appended to a task priority register corresponding with a particular processing unit. The contents of the task priority register and the counter size appended thereto are used to determine the overall priority level for that processing unit. The counter associated with the processing unit is incremented, usually with a wraparound option, when an I/O interrupt is dispatched to that processing unit.

The second solution provides for a distributed interrupt control scheme wherein one interrupt controller assumes global, or system-level, functions such as, for example, I/O interrupt routing, while a plurality of local interrupt controllers, each of which is associated with a corresponding processing unit, control local functions such as, for example, interprocessor interrupts. Both classes of interrupt controllers may communicate through a separate bus, and are collectively responsible for delivering interrupts from interrupt sources to interrupt destinations throughout the system.

Both types of solutions described above are known to have several drawbacks. For example, in the centralized interrupt controller scheme of the foregoing, the width of the counter depends on the maximum number of processors allowed in the system, and because the width is appended to the task priority register of a processor, there is no guarantee that the selected processor for interrupt delivery in fact has the lowest priority, that is, it is the least busy unit, among the listed processors. In addition, since the scheme requires coupling of the centralized interrupt controller to the host bus and system bus, the interrupt messages will consume precious bandwidth on both buses, thereby negatively impacting the overall system performance. Further, the scalability of the centralized scheme will be degraded as more processors are added to the system.

On the other hand, although the distributed architecture has certain advantages, current distributed interrupt controller solutions also do not guarantee that the selected processor is indeed the one with the lowest priority as it is typically required that only those local interrupt controllers that have vacant interrupt slots be included in the lowest priority arbitration. Thus, it is possible that the selected processor might have the highest priority but is the only one that has at least one interrupt slot available.

A distributed interrupt controller solution that overcomes these and other disadvantages is described in greater detail in the co-assigned U.S. patent application, entitled "METHOD AND APPARATUS FOR DISTRIBUTING INTERRUPTS IN A SYMMETRIC MULTIPROCESSOR SYSTEM", cross-referenced hereinabove and concurrently being filed herewith. However, this cross-referenced patent application does not describe bus arbitration for a scalable scheme wherein multiple processors, typically in multiple sets of four processors—an architecture that is favored by digital design—are supported in a distributed interrupt controller system without changing the bus width or bus protocol.

Accordingly, it can be readily appreciated that there is a need for a cost-effective solution providing a scalable MP-compatible interrupt controller scheme that guarantees balanced delivery of interrupts to a processor that has the lowest current task priority among four or more processors without changing the bus width or bus protocol. Further, it would be advantageous to have such a scheme that is compatible with current industry architectures so as to maximize interoperability and interexchangeability. The present invention, described and claimed hereinbelow, provides a method and apparatus for accomplishing these and other objects.

SUMMARY OF THE INVENTION

A method for supporting multiple distributed interrupt controllers, designated as bus agents, in a symmetric multiprocessing system, which method includes the steps of assigning a unique identification number to each bus agent, receiving bus requests from the bus agents over four data lines in groups of four, and granting bus ownership to a selected one of the requesting bus agents.

A computer system that supports multiple distributed interrupt controllers, designated as bus agents, in a symmetric multiprocessing system, which computer system includes structure for assigning a unique identification number to each bus agent, four data lines for receiving bus requests from the bus agents in groups of four, and structure for granting bus ownership to a selected one of the requesting bus agents.

In one aspect of a presently preferred exemplary embodiment, the present invention provides a method of arbitrating bus control requests in a computer system of the type including one or more processing units, each of which is in communication with a corresponding bus agent, and a master arbiter with an internal arbitration pointer; the bus agent and the master arbiter being disposed on a programmable-interrupt-controller bus, the method comprising the steps of: initializing the contents of the internal arbitration pointer; asserting a bus control request signal by each bus agent, said asserting step being effectuated in groups of four if more than four bus agents are listed; and choosing a bus agent by the master arbiter based on an arbitration protocol, transmitting a bus message by the chosen bus agent, and updating the internal arbitration pointer to point to the chosen bus agent.

In another aspect, the present invention provides a computer system of the type including one or more processing units, each of which is in communication with a cache memory unit, the computer system comprising one or more local programmable interrupt controllers, each of which local programmable interrupt controllers is disposed on a programmable-interrupt-controller bus, and at least one central programmable interrupt controller that is also disposed on the programmable-interrupt-controller bus, Each of the local programmable interrupt controllers comprises a current-task-priority register, an interprocessor-interrupt-command port, a who-am-i register, an interrupt-acknowledge register, an end-of-interrupt register, a first local timer, and a second local timer. Further, the central programmable interrupt controller comprises at least one feature-reporting register, at least one global-configuration register, at least one vendor-specific register, a vendor-identification register, a processor-initialization register, at least one interprocessor-interrupt-vector-priority register, a spurious-vector register, at least one global-timer register, and at least one interrupt source register. The exemplary computer system of the present invention also includes a host bus, the host bus being disposed among the cache memory units for providing a communication path therebetween; a first system bus, the first system bus being coupled to the host bus through a first bus-to-bus bridge; and a second system bus, the second system bus being coupled to the first system bus through a second bus-to-bus bridge. Also, a standard 8259A-compatible interrupt controller may be provided on the second system bus such that start-up power-on compatibility is included. Additionally, the programmable-interrupt-controller bus comprises six electrically conductive transmission lines, one clock, one control and four data lines. In a further embodiment, each of the local programmable interrupt controllers may be integrated with its corresponding processing unit.

In a yet another aspect, the present invention includes a method of delivering interrupts in a scalable multiprocessor computer system of the type including a master arbiter residing in a central interrupt controller and one or more bus agents, the central interrupt controller and the bus agents being disposed on a programmable-interrupt-controller bus, the method comprising the steps of: determining the presence of an interrupt; gaining control of the programmable-interrupt-controller bus; determining status as to whether the interrupt is a directed delivery interrupt; delivering the interrupt to a pre-specified processor if the interrupt is determined to be a directed delivery interrupt in response to the step of determining status; otherwise, selecting the unit having the lowest value in its current-task-priority register; and delivering the interrupt thereto in response to the selecting step.

In a further embodiment, the gaining control step further comprises the steps of: asserting a bus request signal by a bus agent; choosing the bus agent by the master arbiter wherein the bus agent is pointed to by an internal arbitration pointer; transmitting a bus message by the chosen bus agent; and incrementing the contents of the arbitration pointer with wraparound.

In a yet another embodiment, the selecting step further comprises the steps of: sending a distributed-interrupt command to the listed bus agents by the master arbiter; transmitting the current task priority level data serially on the programmable-interrupt-controller bus by the listed bus agents in response to the distributed-interrupt command; and determining which listed bus agent has the lowest current task priority level. In this embodiment of the invention, also: if only one bus agent has the lowest current task priority level, then choosing that bus agent for delivery of the interrupt thereto; otherwise, choosing the bus agent that has previously serviced the interrupt for interrupt delivery. Still further in this embodiment of the invention, if no agent has previously serviced the interrupt, then the one with lowest bus identification value is chosen for delivery.

BRIEF DESCRIPTION OF THE DRAWINGS

A more complete understanding of the method and apparatus of the present invention may be had by reference to the following Detailed Description when taken in conjunction with the accompanying Drawings wherein.

DETAILED DESCRIPTION OF DRAWINGS

Figure 1:
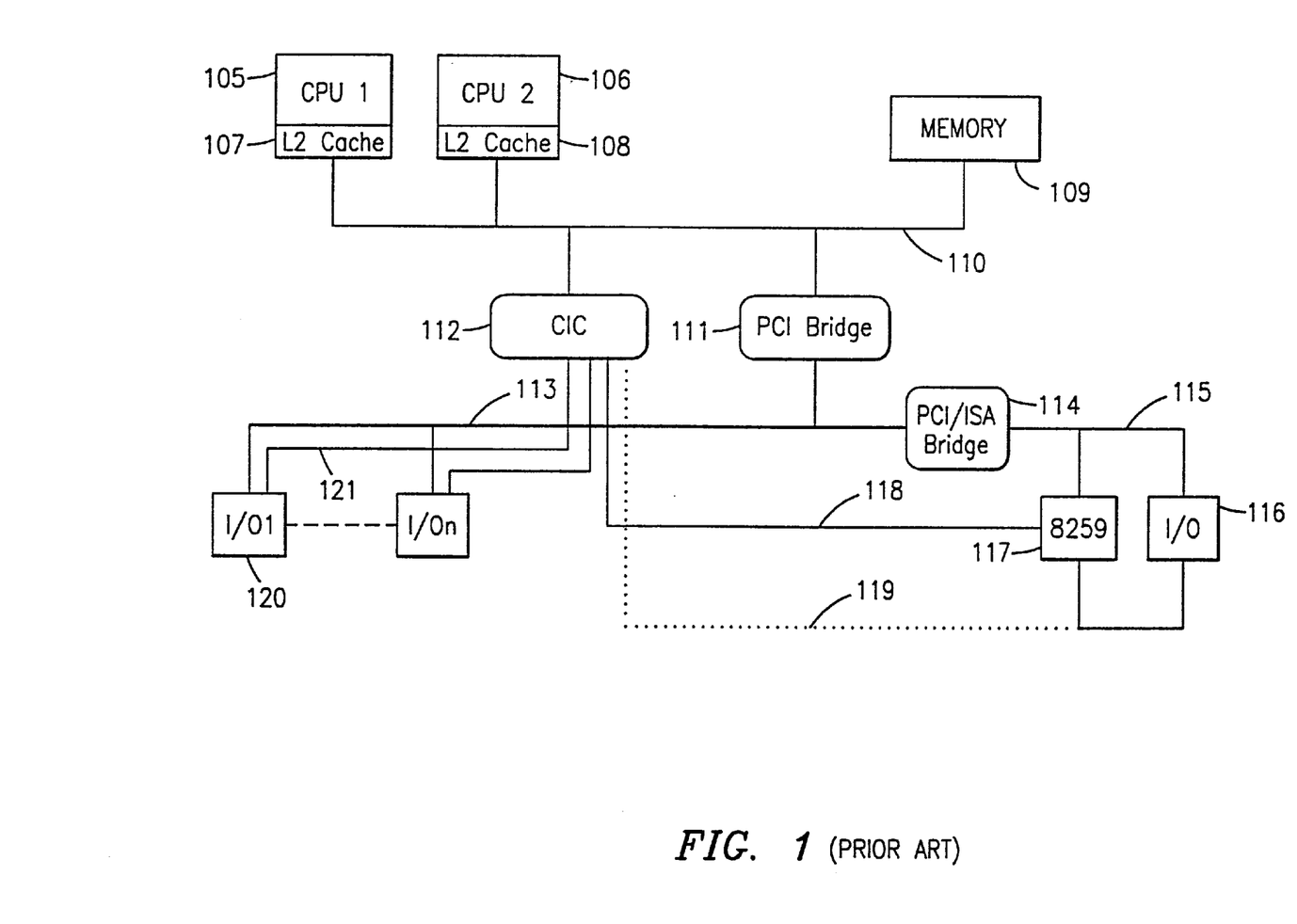
FIG. 1 is a block diagram of a conventional multiprocessor computer system having a centralized interrupt controller.

Referring now to the drawings wherein like or similar elements are designated with identical reference numerals throughout the several views, and wherein the various elements depicted are not necessarily drawn to scale, and in particular to FIG. 1, there is depicted a block diagram of a conventional multiprocessor computer system having a centralized interrupt controller 112. The multiprocessor computer system comprises a plurality of processing units, of which two processors are shown, labeled CPU1 and CPU2 and designated with reference numerals 105 and 106, respectively.

Each of the processors, 105 and 106, is coupled to a corresponding cache memory unit, designated with reference numerals 107 and 108, respectively. A system memory 109 is in communication with the processor/cache combination units via a host bus 110. The centralized interrupt controller (labeled "CIC") 112 is connected to the host bus 110 and a first system bus 113, such as a peripheral component interconnect bus. The first system bus 113 is bridged to the host bus 110 via a first bus-to-bus bridge, labeled PCI bridge and designated with reference numeral 111.

Continuing to refer to FIG. 1, the first system bus 113 is also bridged to a second system bus 115, such as an industry standard architecture ("ISA") bus, via a second bus-to-bus bridge, labeled PCI/ISA bridge and designated with reference numeral 114. Disposed on the first system bus 113 are a first plurality of I/O devices, one of which devices is referenced with reference numeral 120, that may function as I/O interrupt sources. As shown herein, each of these I/O devices is connected to the CIC 112 via its own IRQ path, such as, for example, IRQ line 121.

Still continuing to refer to FIG. 1, disposed on the second system bus 115 are a second I/O block 116 and a conventional 8259 interrupt controller 117. The second I/O block 116 may also function as an interrupt source to the multiprocessor computer system. The output from the 8259 interrupt controller 117 is connected via an IRQ line 119 to the CIC 112 to enable the pass-through mode for start-up operations.

In general operation, after power-on reset, the conventional CIC 112 will default to the 8259 pass-through mode. In this mode, the 8259 interrupt request output will be passed directly through the CIC 112 to a single, pre-selected processor's interrupt request input line and the CIC 112 will be essentially disabled. During SMP operation, the 8259 pass-through mode will be disabled, and the CIC 112 will distribute all system interrupt events, as described immediately hereinbelow.

Each processor, for example CPU1 105, is provided in a 4-processor exemplary implementation with a two-bit counter (not shown) that is initialized to either 00, 01, 10, or 11. Each of these two-bit counters is appended to a four-bit task priority register (not shown) associated with a processor, for example CPU1 105. Therefore, each processor essentially has a six-bit internal priority level, and as can be readily seen, even if all four-bit task priority registers contain the same priority data, each of the four processors will have a different six-bit internal priority level. When an I/O interrupt is dispatched to any of the processors, each processor's two-bit counter is incremented by one (or wrapped around, if necessary). This causes the processor that had the lowest six-bit internal priority level before its counter is incremented to not be the lowest in priority after the increment operation.

As mentioned hereinabove, this implementation does not guarantee that the selected processor will have the lowest four-bit priority level. In addition, since this system requires that the CIC 112 be attached to both the host bus 110 and the first system bus 113, the interrupt messages will congest and consume bus bandwidth on both buses. As can be readily appreciated, by increasing the number of processors in the system, the bus traffic for interrupt control will only exacerbate the situation, thereby compromising system scalability.

Figure 2:
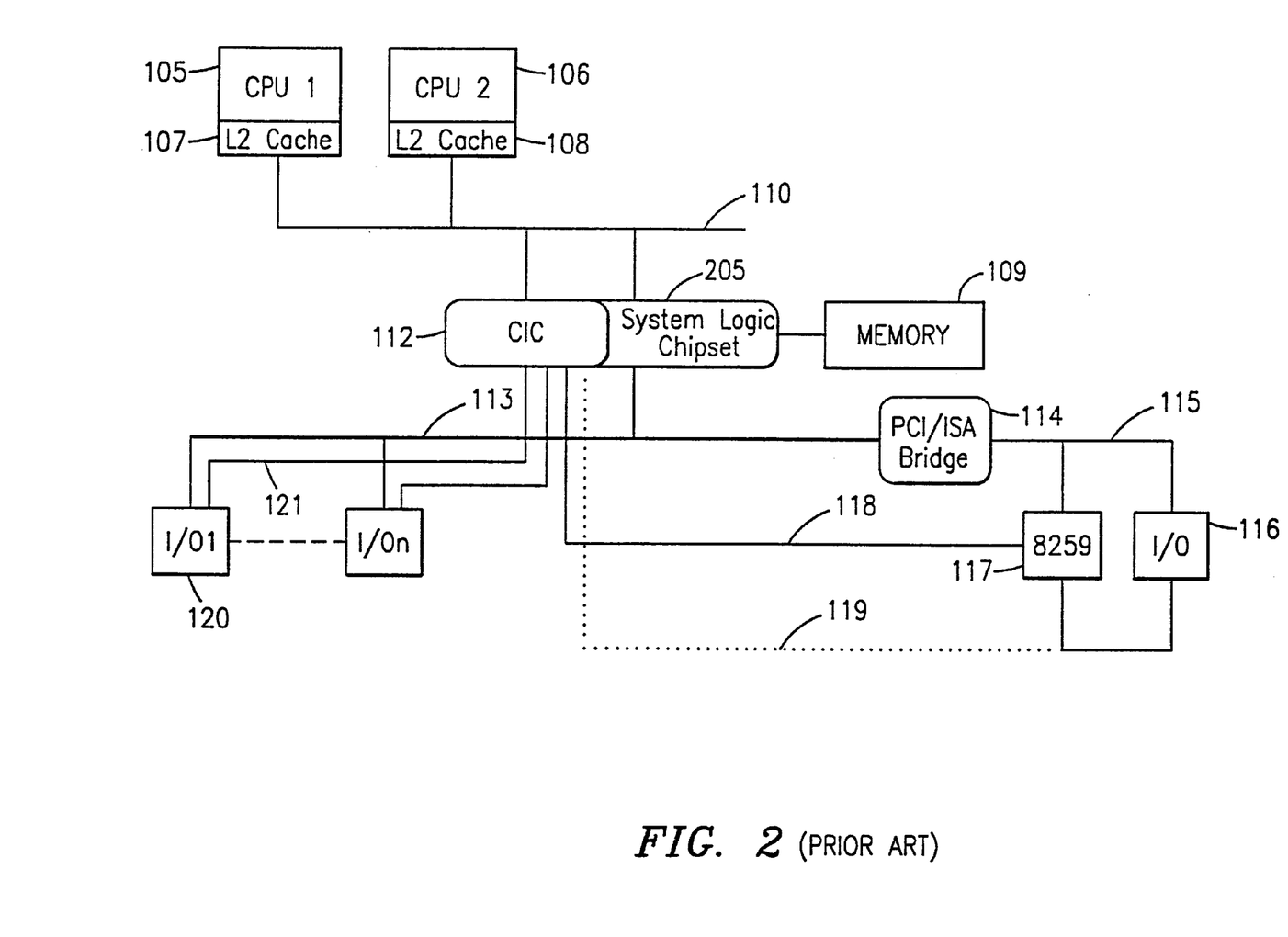
FIG. 2 depicts a block diagram of a second embodiment of the conventional multiprocessor computer system having a centralized interrupt controller.

Referring now to FIG. 2, therein is shown a block diagram of a second embodiment of the conventional multiprocessor computer system having a centralized interrupt controller, described immediately above in reference to FIG. 1. Essentially, the embodiment in FIG. 2 can be seen to be very similar to the embodiment depicted in FIG. 1. In the embodiment of FIG. 2, however, the CIC 112 is integrated into a system logic chipset 205 such that it has internal connection capability to both the host bus 110 and the first system bus 113. Although this embodiment may provide certain advantages over the embodiment of FIG. 1, such as, for example, lower cost and pin count, it is still burdened with the disadvantages, such as, for example, consumption and congestion of the host/system buses; uncertainness in the priority of the selected processor; and less-than-optimal scalability, discussed hereinabove.

Figure 3:
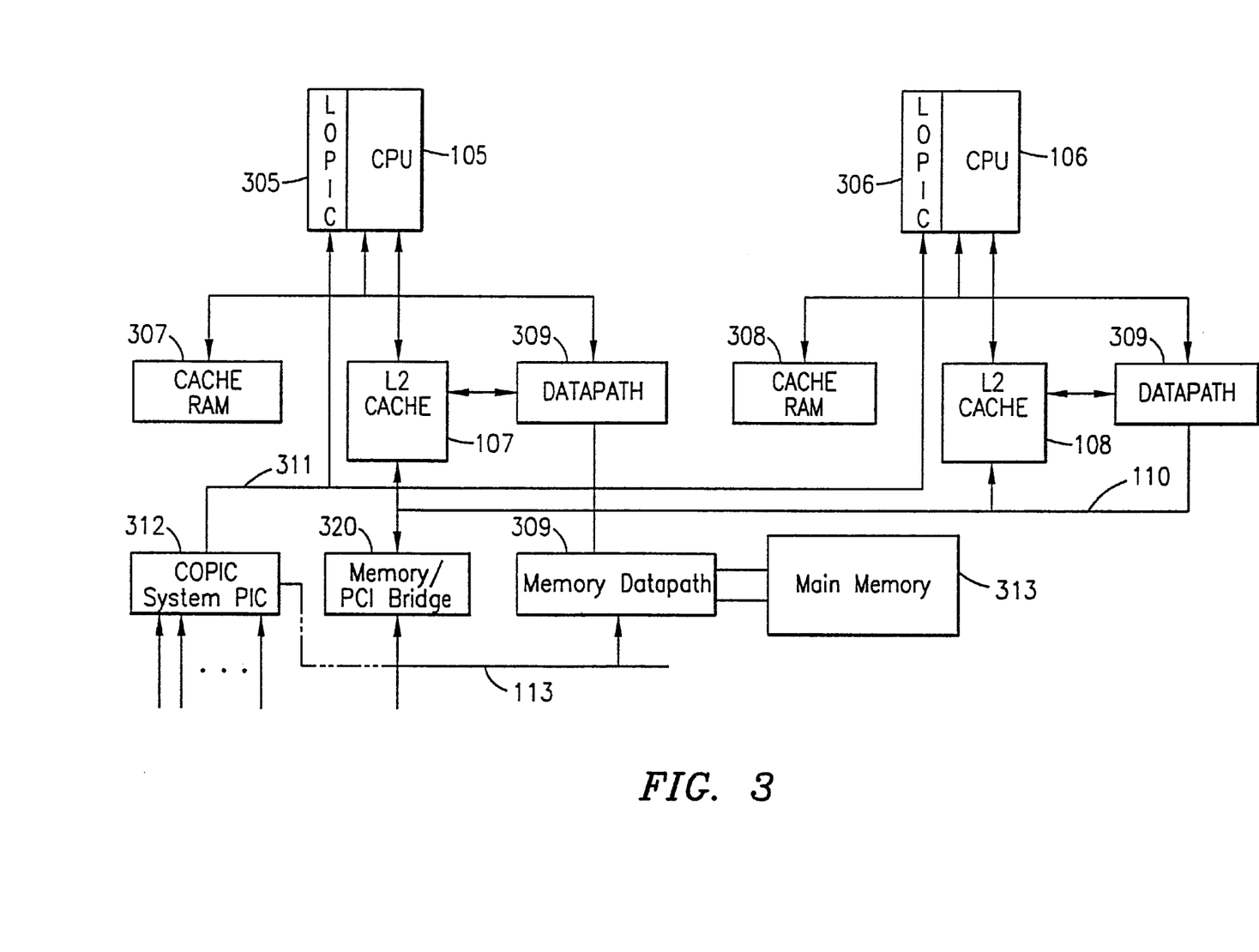
FIG. 3 depicts a block diagram of a first embodiment of the present invention directed to a scalable multiprocessor computer system having a distributed interrupt control scheme wherein four or more processing units are disposed.

FIG. 3 depicts a block diagram of a first exemplary embodiment of the present invention directed to a scalable multiprocessor computer system having a distributed interrupt control scheme. The exemplary multiprocessor computer system may have one or more processors, two of which are labeled and designated as CPU 105 and CPU 106. Each of the processors, for example, CPU 105 or CPU 106, is coupled to a corresponding local programmable interrupt controller, for example, LOPIC 305 or LOPIC 306, respectively. According to the teachings of the present invention, each LOPIC handles interrupt delivery protocol with its corresponding processor. The LOPIC also handles accesses to the processor's internal registers, inter-processor interrupts ("IPI") and remote accesses. In addition, each LOPIC can be disabled by hardware, or software. Each LOPIC may be used in conjunction with a standard 8259A-compatible interrupt controller (not shown in this FIG.) for start-up pass-through mode capability. In a presently preferred embodiment, each LOPIC contains two local timers (not shown) which may be used by the system software to monitor system performance and/or for diagnostic purposes. Further, each LOPIC contains a interprocessor-interrupt-command port (not shown), writing to which port will cause an IPI to be sent to one or more processors; and a current-task-priority register ("CTPR") which is used for setting the current task priority of each processor. The task priority indicates the relative importance of the currently executing task. In this exemplary embodiment, priority levels from 0 to 15 are implemented.

Continuing to refer to FIG. 3, each LOPIC, for example LOPIC 305, further contains a who-am-i register which provides a mechanism for each processor, for example, CPU 105, to determine the ID value of that processor. This value may be used to determine the value of the destination masks used for delivering interrupts. The LOPIC 305 also contains an interrupt-acknowledge register; and an end-of-interrupt ("EOI") register, writing a zero to which register will signal the end of processing for the interrupt currently in progress for the associated processor.

Figure 8:
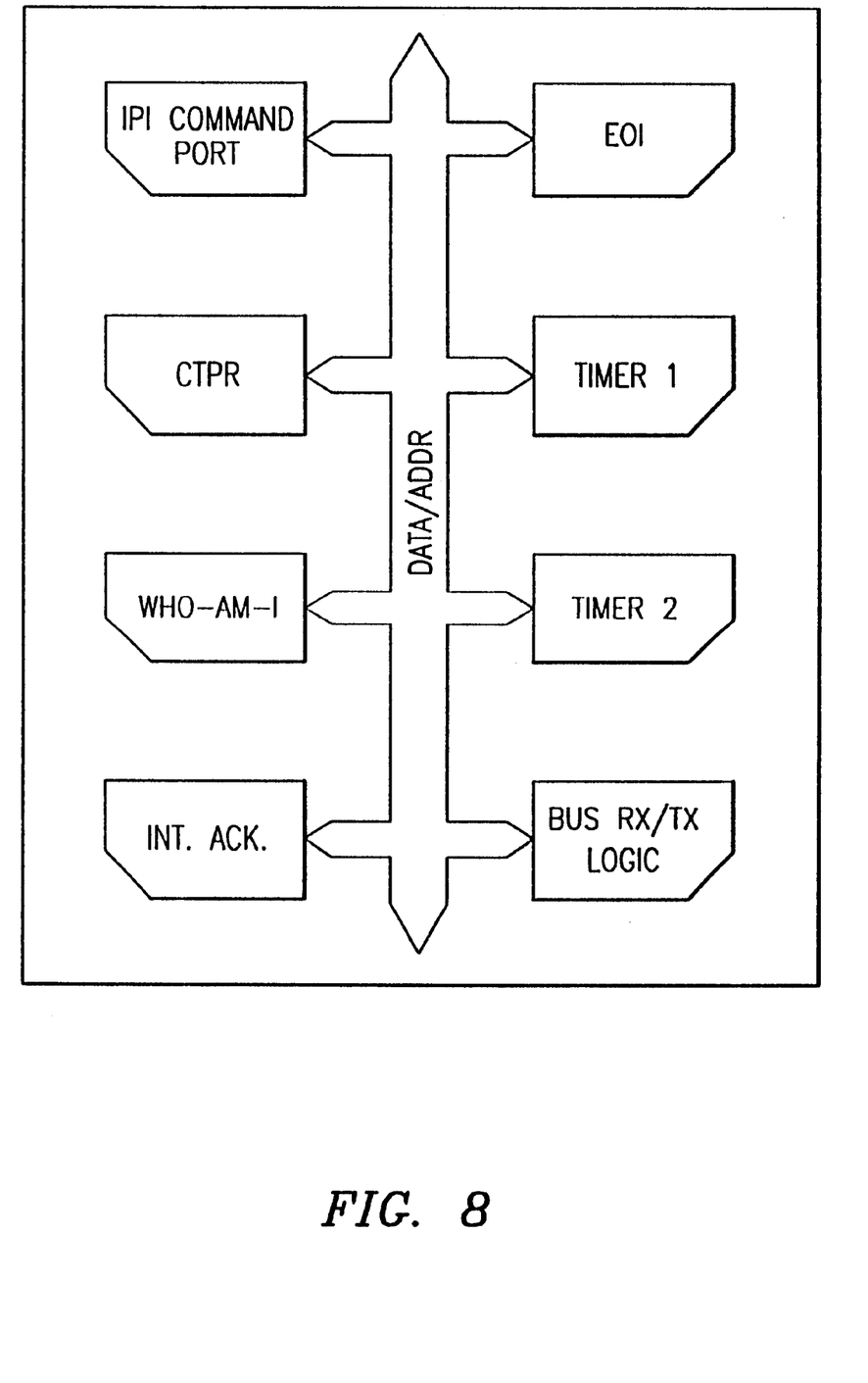
FIG. 8 illustrates an exemplary embodiment of a local programmable interrupt controller in accordance with the teachings of the present invention.

FIG. 8 depicts an exemplary embodiment of LOPIC 305 and its contents, which contents may be implemented and interconnected conventionally to allow execution of LOPIC functions in embodiments of the present invention.

Referring again to FIG. 3, each processor, for example, CPU 105, is in data communication with an associated cache memory unit, for example, cache 107. There may also be secondary cache; for example, cache RAM 307 and cache RAM 308; that is connected via a data path 309 to a main memory 313. Cache 107 and cache 108 are electrically connected to a host bus 110 which is bridged via a first bus-to-bus bridge, bridge 320, to a first system bus 113, such as a PCI bus. Although not shown in this FIG., it can be appreciated that a second system bus, for example, an EISA or ISA bus may be bridged to the bus 113 via a suitable bus-to-bus bridge.

Still continuing to refer to FIG. 3, each LOPIC, for example LOPIC 305 or LOPIC 306, is connected via a programmable-interrupt-controller bus 311 to a central programmable interrupt controller, COPIC 312. Although only one COPIC 312 is shown in this embodiment, it can be readily understood upon reference hereto that a plurality of central programmable interrupt controllers may be used in a system constructed according to the teachings of the present invention. In an SMP environment, multiple LOPIC and COPIC units operate together and are collectively responsible for delivering interrupts from interrupt sources to interrupt destinations throughout the system. The COPIC 312 is connected to a plurality of I/O interrupt sources (not shown), and provides functions such as I/O interrupt routing, masking of interrupts and bus arbitration. The presently preferred embodiment of COPIC 312 contains global registers such as feature-reporting registers, global-configuration registers, vendor-specific registers, a vendor-identification register, a processor-initialization register, IPI-vector/priority registers, a spurious-vector register, global-timer registers, and interrupt-source registers.

Figure 9:
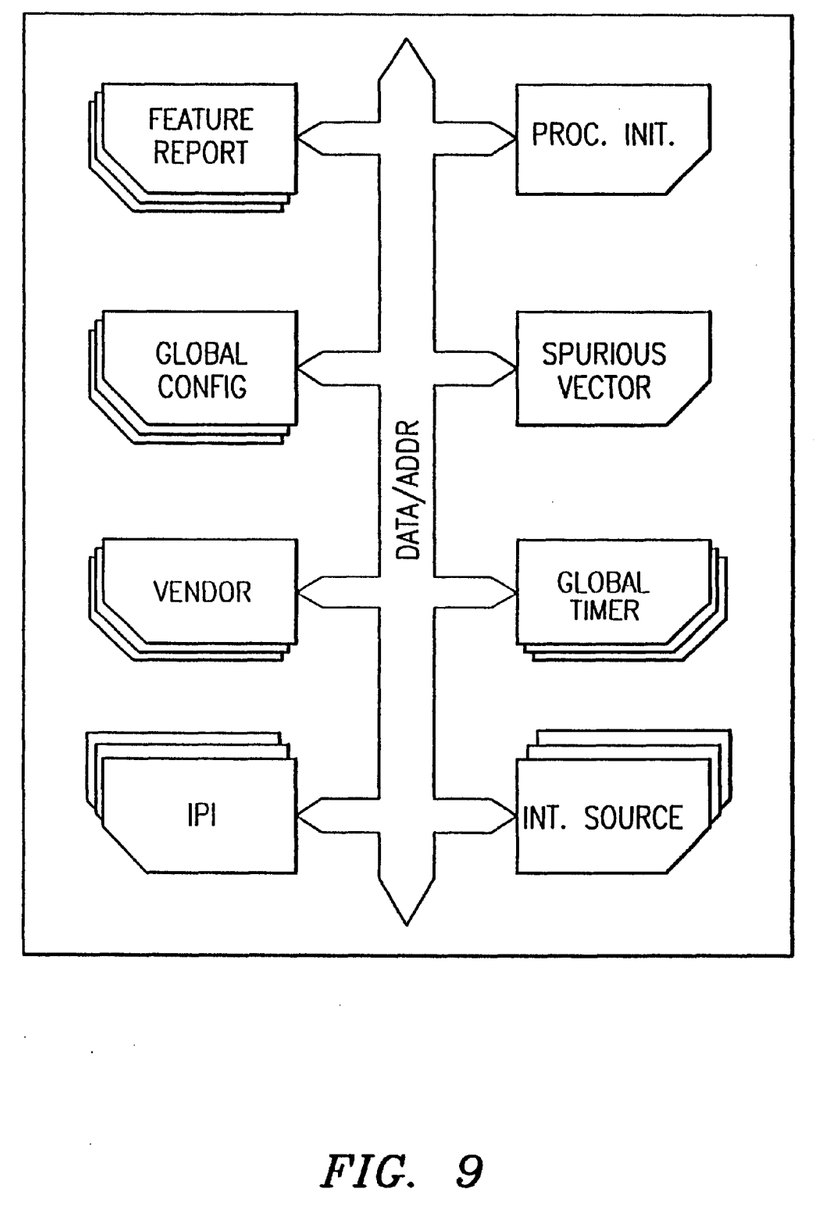
FIG. 9 illustrates an exemplary embodiment of a central programmable interrupt controller in accordance with the teachings of the present invention.

FIG. 9 depicts an exemplary COPIC 312 and its contents, which contents may be implemented and interconnected conventionally to allow execution of COPIC functions in embodiments of the present invention.

Referring again to FIG. 3, the programmable-interrupt-controller bus 311 is preferably a six-wire, multi-phase, bi-directional shared bus having four data lines, one control line, and a clock line. The bus 311 is preferably optimized at present for a four-processor environment. However, as will be seen hereinbelow in specific reference to FIGS. 5, 6 and 7, the bus arbitration protocol is amenable in accordance with the teachings of the present invention to supporting more than four processors without having to change the bus width, thereby maintaining scalability. In a system with multiple COPIC and LOPIC units, one COPIC will be a priori designated as a master/arbiter and the non-master COPICs and the LOPICs (which may be integrated with their respective processing units, as shown in this FIG.) will be treated collectively as bus agents. The general operation of bus arbitration and interrupt delivery will be discussed below in specific reference to FIGS. 5, 6, and 7.

Figure 4:
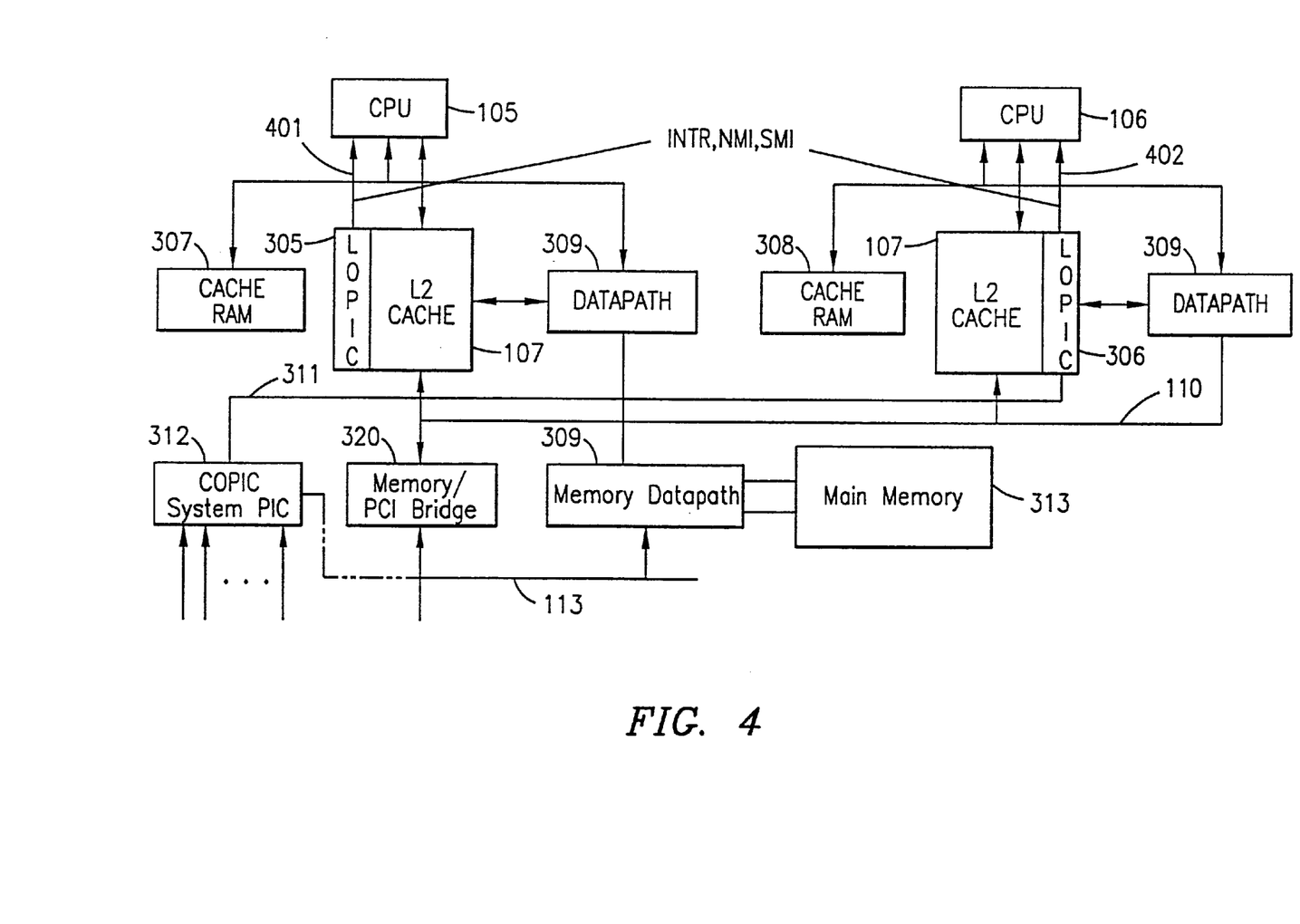
FIG. 4 depicts a block diagram of a second embodiment of the present invention.

Referring now to FIG. 4, therein is depicted a block diagram of a second embodiment of the present invention directed to a multiprocessor computer system having a distributed interrupt control scheme. This embodiment is similar to the one discussed in detail hereinabove in reference to FIG. 3. However, the LOPIC units, 305 and 306, are provided in this embodiment as external units that are in communication with their corresponding processors, CPU 105 and 106, via external paths 401 and 402, respectively, rather than as integrated units with processors having internal access thereto. It can be readily understood that the exemplary embodiment discussed in reference to FIG. 3 provides a better solution in terms of lower cost and lower pin count than the one described in this FIG., but this design is an alternative design that may be usefully implemented in some applications.

Figure 5:
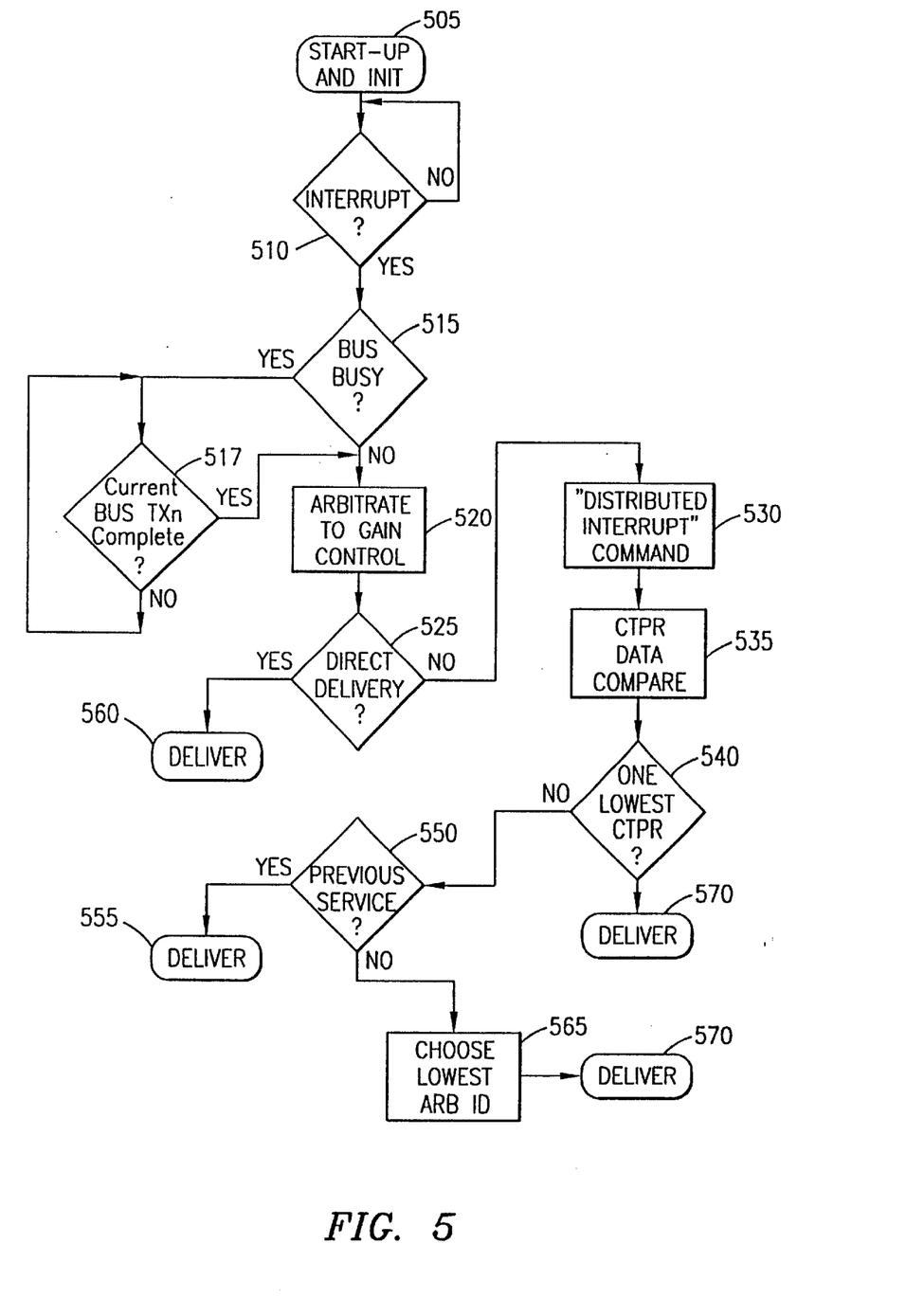
FIG. 5 illustrates an exemplary flowchart for delivering interrupts in a multiprocessor computer system having a distributed interrupt control scheme in accordance with the teachings of the present invention.

FIG. 5 is an exemplary flowchart for delivering interrupts in an SMP environment in accordance with the teachings of the present invention. During system power up and initialization step 505, each bus agent (discussed in reference to FIG. 3) is assigned a unique arbitration identification ("Arb ID") value. Because of the 8259A-compatibility, the power up reset will have been processed by a prespecified processor in the system. In addition, each bus agent will be initialized as to the total number of bus agents on the programmable-interrupt-controller bus 311 (shown in FIG. 3). The preferred method is to allow the system software ("OS") to control and provide all the necessary information during the system initialization phase 505. In order to maintain scalability, the preferred embodiment employs an encoded 5-bit register wherein a value of "00000" indicates the presence of one bus agent and one master COPIC; a value of "00001" indicates two bus agents and one master COPIC; and so on, up to a value of "11110" indicating 31 bus agents and one master COPIC. Additionally, a value of "11111" in the encoded 5-bit register indicates a RESET in the exemplary embodiment.

If the system detects the presence of an interrupt, as provided in the decision block 510, then either a COPIC or a LOPIC must gain control of the programmable-interrupt-controller bus 311 before a bus message may be delivered therethrough. If the bus 311 is busy, as determined in the decision block 515, then a bus agent must wait until the bus 311 is idle, as indicated in the decision block 517. Then, once the current bus transaction is complete, the bus agent must arbitrate to gain a bus grant, since only the master/arbiter COPIC will have total control of its bus request line which is connected to the control line of the bus. The arbitration phase 520 will be discussed in greater detail hereinbelow in specific reference to FIGS. 6 and 7, taken together. If the bus 311 is idle, an agent or the master may directly start an arbitration cycle to gain a bus grant.

Upon entering the decision block 525 after gaining control of the bus 311, a determination is made if the interrupt is a directed delivery mode interrupt or a distributed delivery mode interrupt. If the determination is that the interrupt is a directed delivery mode interrupt, then by taking the YES path therefrom, data is delivered to the destination processor (or, bus agent/LOPIC, if the processor and its LOPIC are not integrated together) on a plurality of data lines, for example, four data lines, that comprise a portion of the bus 311.

If the determination in step 525 is that the interrupt is a distributed delivery mode interrupt, then a COPIC will send a "distributed interrupt" command to all listed agents, as provided in step 530. Each agent then provides its current task priority level (CTPR) by transmitting its four-bit priority level serially via the data line that is used to request the bus with. Because the number of bits in a CTPR level is four, a total of four cycles is required for each agent to provide its CTPR value to the COPIC.

After receiving the CTPR values, the COPIC compares and selects in step 535 the agent that has the is lowest CTPR value (0 is the lowest, meaning the least busy; 15 is the highest). If only one agent has the lowest CTPR value, then by taking the YES path from decision block 540, the interrupt is delivered to that agent. Otherwise, a determination is made in decision block 550 to select the agent that previously serviced the same interrupt for delivery thereof as provided in step 555. If, on the other hand, no agent previously serviced that interrupt, then a choice is made in step 565 to select the agent based on its unique Arb ID, for example, selecting the one with the lowest Arb ID for delivering the interrupt thereto.

Figure 6:
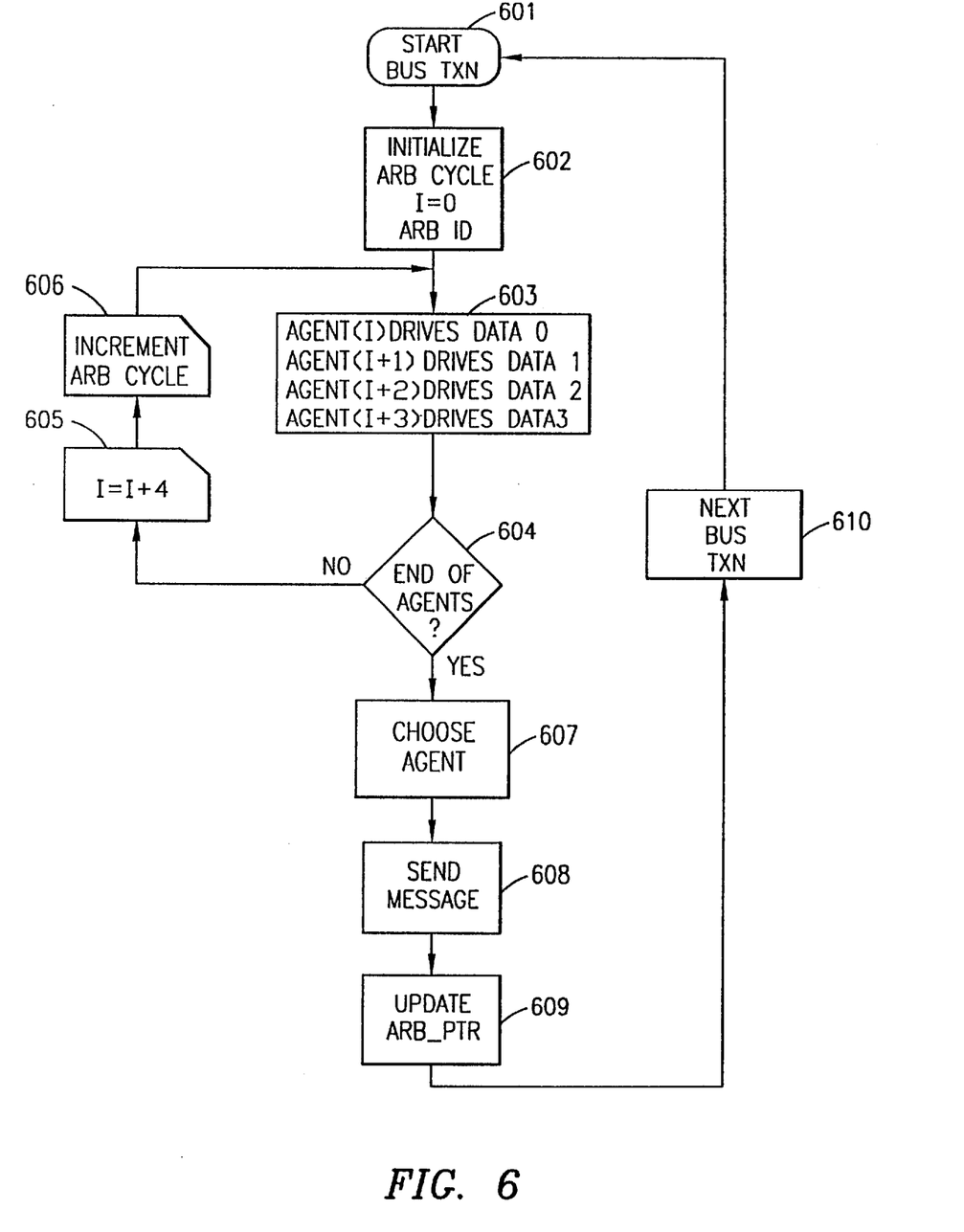
FIG. 6 illustrates an exemplary flowchart for bus arbitration in a scalable multiprocessor computer system including four or more processing units.
Figure 7:
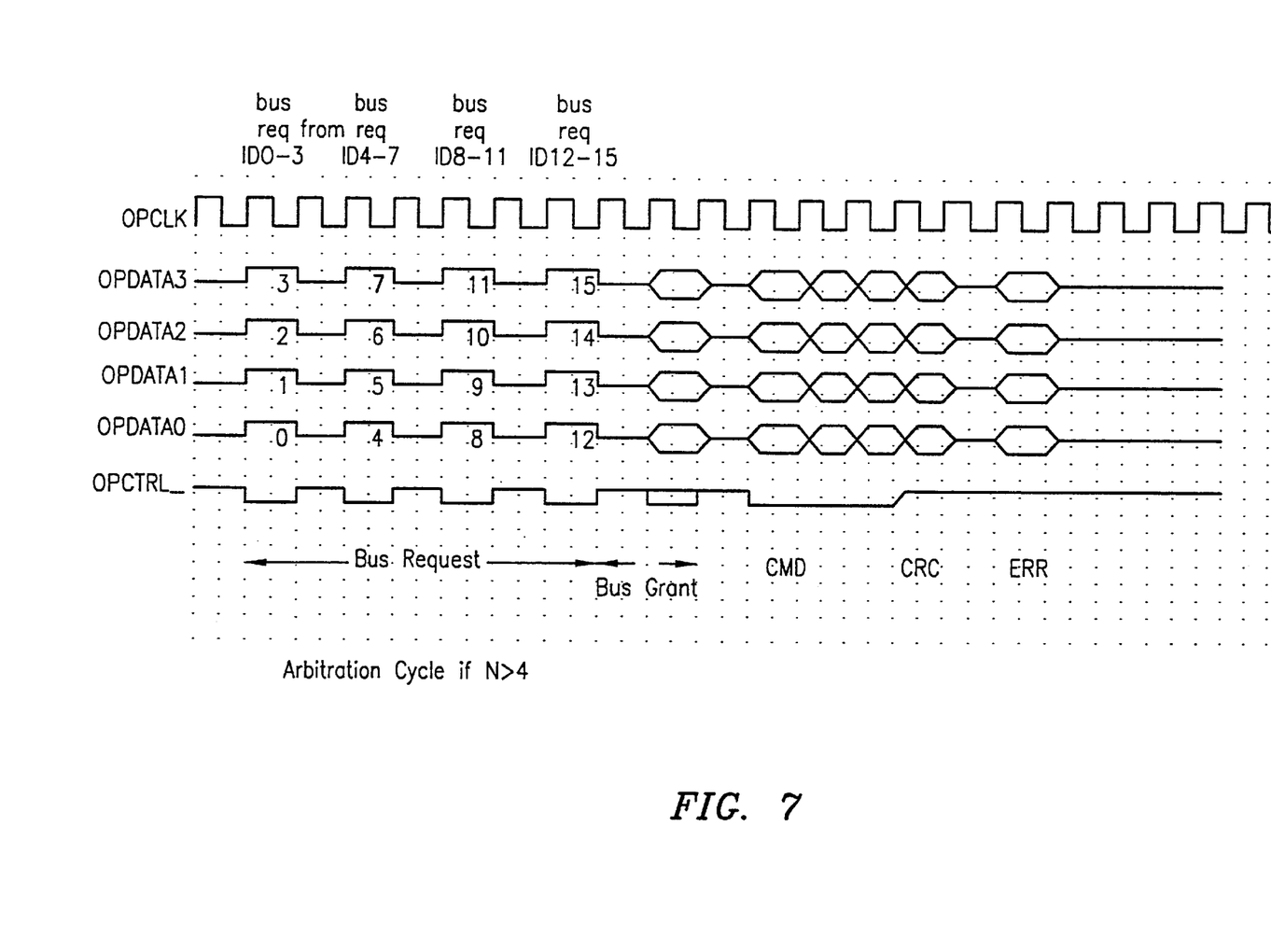
FIG. 7 depicts an exemplary timing diagram for bus arbitration with multiple arbitration cycles in accordance with the teachings of the present invention.

Referring now to FIGS. 6 and 7 together, a scheme for bus arbitration in an exemplary scalable MP system having four or more processing units (each of which may be integrated with its respective LOPIC) is described in a flowchart in FIG. 6 and as a bus timing diagram in FIG. 7. As can be readily appreciated, the same bus arbitration scheme may be used in an embodiment having less than four processing units without deviating from the scope of the present invention. For example, if there are only two processing units, only two data lines will be pulled HIGH for arbitration, as will be described hereinbelow in reference to a exemplary generic embodiment.

The arbitration phase, which was designated as step 520 in FIG. 5, is entered into with the start of a bus transaction shown in the step 601. After the initialization step 602, during the first arbitration cycle, the first four bus agents issue their respective bus request signals by asserting ACTIVE HIGH on their own bus request lines that are connected to the data lines of the bus 311 (shown in FIG. 3). For example, during the first arbitration cycle, agent 0 which is connected to OPDATA 0 (shown in FIG. 7), drives that line, referred to as DATA 0 in this flowchart. Similarly, agent 1 which is connected to OPDATA 1 (shown in FIG. 7), drives that line, referred to as DATA 1 in this flowchart; agent 2 which is connected to OPDATA 2 (shown in FIG. 7), drives that line, referred to as DATA 2 in this flowchart; and agent 3 which is connected to OPDATA 3 (shown in FIG. 7), drives that line, referred to as DATA 3 in this flowchart. If no more agents are present or detected, as provided in the step 604, the master/arbiter COPIC will select a bus agent by employing a "rotating priority" or "round robin" arbitration protocol to grant the bus 311 for message delivery, as shown in steps 607 and 608. For this purpose, the master/arbiter COPIC in the exemplary embodiment utilizes an internal circular pointer, denoted as ARB_PTR, that points to the bus agent that has been granted the most recent bus request. According to one aspect of the present invention, the bus agent that is pointed to by the contents of the ARB_PTR is accorded the least priority of bus arbitration; and, further, the bus agent that is pointed to by a wraparound increment of the ARB_PTR value by one is accorded the highest priority. In a presently preferred exemplary embodiment, a 5-bit ARB_PTR is provided for scalably accommodating up to 32 units, 31 bus agents and one master COPIC. On power-up, this 5-bit ARB_PTR is initialized to "11111" such that the bus agent pointed to by "00000" will have the highest priority for the up-coming bus arbitration. If, on the other hand, the total number of bus agents and master COPIC is less than 32, then, the most significant bits of the ARB_PTR will be appropriately masked.

Continuing to refer to FIG. 6, once the control of the bus 311 is granted, the requester may immediately start sending its message, with a Cyclic Redundancy Check ("CRC") and ERROR check (shown in FIG. 7). After each successfully transmitted message, the master/arbiter COPIC increments or updates its ARB_PTR to point to the bus agent that successfully transmitted the message, as provided in step 609. At the end of current bus transaction, the bus arbitration process phase may begin again for the next bus transaction 610.

On the other hand, if more than four agents are arbitrating for bus control, then by taking the NO path from the decision block 604, the arbitration cycle counter is incremented, as in step 606, and the next arbitration cycle may start over again, with additional agents, for example, agents 4, 5, 6 and 7 driving data lines OPDATA 0, OPDATA 1, OPDATA 2, and OPDATA 3, respectively, as shown in FIG. 7. If the list of agents is exhausted, as provided in 604, then the bus control is granted in the same manner as discussed above.

From the foregoing, it can be readily appreciated by those skilled in the art that the present invention provides a highly cost-effective solution for balanced delivery of interrupts to their destinations in a scalable MP environment having four or more processing units without changing the bus width or bus protocol. The disclosed method requires that only CTPR values for each bus agent be compared for determining lowest current task priority, thereby ensuring that in the dynamic delivery mode, an interrupt is always distributed to the agent that is least busy. Further, by distributing control between local interrupt controllers and central interrupt controllers that are disposed on a dedicated interrupt bus, it can be realized that the impact on the host bus traffic or system bus traffic is rendered vanishingly small. With integration of local interrupt controllers with their corresponding processing units, a low cost, low pin count solution that is highly scalable in an MP system architecture having four or more processors is achieved. Furthermore, as described hereinabove, the present invention may also be practiced with fewer than four processing units without having to change the bus width or bus protocol. Accordingly, it is to be understood that the present invention provides a highly scalable solution that can support one or more processing units in an MP-environment.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for supporting multiple distributed interrupt controllers, designated as bus agents in a symmetric multi-processing system, said method comprising the steps of:

assigning a unique identification number to each bus agent;

receiving bus requests from the bus agents in groups of four over a single programmable-interrupt-controller bus comprising four data lines;

arbitrating for control of said propgrammable-interrupt-controller bus, said arbitration step involving one or more arbitration phases each one of which phases corresponds to a particular group of four agents and is effectuated on said single programmable-interrupt-controller bus; and granting bus ownership to a selected one of the requesting bus agents.

2. The method as set forth in claim 1, wherein up to thirty-two bus agents can be supported without changing bus protocol or width associated with said single programmable-interrupt-controller bus.

3. A computer system that supports multiple distributed interrupt controllers, designated as bus agents, in a symmetric multiprocessing system, said computer system comprising:

a single programmable-interrupt-controller bus comprising four data lines;

means for assigning a unique identification number to each bus agent;

means for receiving bus requests from the bus agents in groups of four;

means for accommodating an arbitration scheme wherein an arbitration cycle comprises one or more arbitration phases, each one of which phases corresponds to a particular group of four bus agents and is effectuated on said single programmable-interrupt-controller bus; and means for granting bus ownership to a selected one of the requesting bus agents.

4. The computer system as set forth in claim 3, wherein up to thirty-two bus agents can be supported without changing bus protocol or width associated with said single programmable-interrupt-controller bus.

5. The computer system as recited in claim 3, wherein said means for assigning comprises a central processor.

6. The computer system as recited in claim 3, wherein said means for granting comprises a central programmable interrupt controller.

7. A method of arbitrating bus control requests in a computer system of the type including one or more processing units, each of which is in communication with a corresponding bus agent; and a master arbiter with an internal arbitration pointer; the bus agents and the master arbiter disposed on a single programmable-interrupt-controller bus, the method comprising the steps of:

initializing the contents of the internal arbitration pointer;

receiving bus requests from the bus agents in groups of four over said single programmable-interrupt-controller bus comprising four data lines;

arbitrating for control of said single programmable-interrupt-controller bus, said arbitration step involving one or more arbitration phases, each one of which phases corresponds to a particular group of four agents; and     choosing a bus agent by the master arbiter based on an arbitration protocol, transmitting a bus message by the chosen bus agent, and updating the internal arbitration pointer to point to the chosen bus agent.

8. The method of arbitrating bus control requests in a computer system as set forth in claim 7, further comprising the steps of:

initializing an arbitration cycle if more than four bus agents are listed; and     initializing a counter if more than four bus agents are listed.

9. The method of arbitrating bus control requests in a computer system as set forth in claim 8, wherein said arbitration cycle is initialized by setting it to one and said counter is initialized by setting it to zero.

10. A computer system including a subsystem for arbitrating bus control requests of the type including one or more processing units, each of which is in communication with a corresponding bus agent, the bus agents disposed on a single programmable-interrupt-controller bus, the subsystem comprising:

means for initializing an internal arbitration pointer;

means for asserting a bus control request signal;

means for accommodating an arbitration scheme wherein an arbitration cycle comprises one or more arbitration phases, each one of which phases corresponds to a particular group of four bus agents and is effectuated on said single programmable-interrupt-controller bus;

means for choosing a listed bus agent based on said arbitration cycle; and     means for updating said internal arbitration pointer.

11. The computer system as set forth in claim 10, wherein said means for asserting a bus control request comprises a signal generating means for generating an active high signal.

12. The computer system as set forth in claim 10, wherein said means for choosing comprises a central programmable interrupt controller disposed on said single programmable-interrupt-controller bus.

\* \* \* \* \*